(12) United States Patent
Hirabayashi et al.

(10) Patent No.: US 11,498,675 B2
(45) Date of Patent: Nov. 15, 2022

(54) LAND-AND-AIR VEHICLE

(71) Applicant: SUBARU CORPORATION, Tokyo (JP)

(72) Inventors: Daisuke Hirabayashi, Tokyo (JP); Yoshiyuki Matsumoto, Tokyo (JP); Takumi Ishikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 161 days.

(21) Appl. No.: 15/931,118

(22) Filed: May 13, 2020

(65) Prior Publication Data
US 2021/0061457 A1 Mar. 4, 2021

(30) Foreign Application Priority Data
Aug. 28, 2019 (JP) .............................. JP2019-155147

(51) Int. Cl.
*B64C 37/00* (2006.01)
*B64D 27/02* (2006.01)
(Continued)

(52) U.S. Cl.
CPC ................ *B64C 37/00* (2013.01); *B60F 5/02* (2013.01); *B64C 3/385* (2013.01); *B64C 3/40* (2013.01);
(Continued)

(58) Field of Classification Search
CPC ... B64C 37/00; B64C 13/044; B64C 13/0421; B64C 13/042; B64C 13/0423; B60F 5/003; B60F 5/02; B64D 31/04
See application file for complete search history.

(56) References Cited

U.S. PATENT DOCUMENTS

| | | | | |
|---|---|---|---|---|
| 2,322,715 A | * | 6/1943 | Kloeren | .................. B64C 27/24 244/7 A |
| 4,134,560 A | * | 1/1979 | Messerschmidt | ....... B64C 27/58 244/17.25 |

(Continued)

FOREIGN PATENT DOCUMENTS

| | | | | |
|---|---|---|---|---|
| CN | 112572778 A | * | 3/2021 | ......... B60G 17/0165 |
| DE | 102008028365 A1 | * | 12/2009 | ............. B64C 13/04 |

(Continued)

*Primary Examiner* — Joshua J Michener
*Assistant Examiner* — Ryan Andrew Yankey
(74) *Attorney, Agent, or Firm* — McDermott Will & Emery LLP

(57) ABSTRACT

A land-and-air vehicle configured to switch between a first form to be taken during ground traveling and a second form to be taken during flight includes a main body, a main wing unit, an operation unit, and a controller. The controller is configured to control, on the basis of an operation performed on the operation unit by an operator, a behavior of the land-and-air vehicle during the ground traveling and during the flight. The operation unit includes a handle and a step. The handle of the operation unit includes a throttle unit. The controller is configured to control, both during the ground traveling and during the flight, yawing of the land-and-air vehicle in response to an operation performed on the handle, and to control thrust for the land-and-air vehicle during the flight in response to an operation performed on the throttle unit.

6 Claims, 4 Drawing Sheets

(51) Int. Cl.
  *B64D 31/04* (2006.01)
  *B64C 29/00* (2006.01)
  *B64C 13/04* (2006.01)
  *B60F 5/02* (2006.01)
  *B64C 3/40* (2006.01)
  *B64C 3/38* (2006.01)
(52) U.S. Cl.
  CPC .......... *B64C 13/042* (2018.01); *B64C 13/044* (2018.01); *B64C 29/0033* (2013.01); *B64D 27/02* (2013.01); *B64D 31/04* (2013.01)

(56) References Cited

U.S. PATENT DOCUMENTS

| | | | | |
|---|---|---|---|---|
| 4,657,207 | A * | 4/1987 | Poling | B60F 5/02 |
| | | | | 180/7.4 |
| 4,928,907 | A * | 5/1990 | Zuck | B64C 27/26 |
| | | | | 244/48 |
| 5,738,302 | A * | 4/1998 | Freeland | B60V 1/15 |
| | | | | 180/116 |
| 7,178,757 | B1 * | 2/2007 | Breese | B64C 27/02 |
| | | | | 244/17.11 |
| 7,515,999 | B2 * | 4/2009 | Wolff | B64C 37/00 |
| | | | | 701/3 |
| 2003/0094539 | A1 * | 5/2003 | Schaeffer | B64D 31/04 |
| | | | | 244/17.13 |
| 2009/0200431 | A1 * | 8/2009 | Konings | B64C 23/072 |
| | | | | 244/213 |
| 2010/0083669 | A1 * | 4/2010 | Foster | B64D 31/04 |
| | | | | 60/802 |
| 2015/0134149 | A1 * | 5/2015 | De Mers | B64D 31/04 |
| | | | | 701/3 |
| 2015/0183511 | A1 * | 7/2015 | Ott | B64D 31/04 |
| | | | | 244/50 |
| 2017/0166297 | A1 * | 6/2017 | Guering | B64C 13/044 |
| 2017/0297605 | A1 | 10/2017 | Klein | |
| 2018/0297698 | A1 * | 10/2018 | Dhall | B64C 11/28 |
| 2018/0312251 | A1 * | 11/2018 | Petrov | B64C 27/28 |
| 2018/0339763 | A1 * | 11/2018 | Marini | B64C 13/044 |
| 2021/0284333 | A1 * | 9/2021 | Windisch | B64C 29/0066 |

FOREIGN PATENT DOCUMENTS

| | | | | |
|---|---|---|---|---|
| EP | 3335914 | A1 * | 6/2018 | .......... B64C 13/044 |
| EP | 3335915 | A1 * | 6/2018 | .............. B64C 3/56 |
| JP | 2013-244898 | A | 12/2013 | |
| JP | 2017-185866 | A | 10/2017 | |
| JP | 2017-534514 | A | 11/2017 | |
| WO | WO-2014144001 | A2 * | 9/2014 | .......... B64C 11/001 |

* cited by examiner

LAND-AND-AIR VEHICLE

CROSS-REFERENCE TO RELATED APPLICATIONS

The present application claims priority from Japanese Patent Application No. 2019-155147 filed on Aug. 28, 2019, the entire contents of which are hereby incorporated by reference.

BACKGROUND

The technology relates to a land-and-air vehicle.

A land-and-air vehicle is able to travel on the ground and also fly in the air. As such a land-and-air vehicle, Japanese Unexamined Patent Application Publication (JP-A) No. 2017-185866 describes a vehicle that has both a steering wheel to be used for steering during ground traveling and an operating stick (control stick) to be used for steering during flight. The operating stick is separate from the steering wheel. JP-A No. 2013-244898 describes a technique taking into consideration a burden on an operator due to the use of different operating devices (a steering wheel and an operating stick) between during ground traveling and during flight. The technique enables an operating device to be used as a steering wheel during ground traveling to serve also as a steering wheel (control wheel) during flight. Furthermore, JP-A No. 2017-534514 describes a steering wheel-shaped operating device configured to be used for both steering during ground traveling and steering during flight.

SUMMARY

An aspect of the technology provides a land-and-air vehicle configured to switch between a first form to be taken during ground traveling and a second form to be taken during flight. The ground traveling is a state of traveling on a ground and the flight is a state of flying in air. The land-and-air vehicle includes a main body, a main wing unit, an operation unit, and a controller. The main body includes an operator seat for an operator. The main wing unit is attached to the main body and includes a wing configured to produce lift for the land-and-air vehicle during the flight. The operation unit is configured to be operated by the operator. The controller is configured to control, on the basis of an operation performed on the operation unit by the operator, a behavior of the land-and-air vehicle during the ground traveling and during the flight. The operation unit includes a handle to be operated by a hand of the operator and a step to be operated by a foot of the operator. The handle of the operation unit includes a throttle unit. The controller is configured to control, both during the ground traveling and during the flight, yawing of the land-and-air vehicle in response to an operation performed on the handle, and to control thrust for the land-and-air vehicle during the flight in response to an operation performed on the throttle unit.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
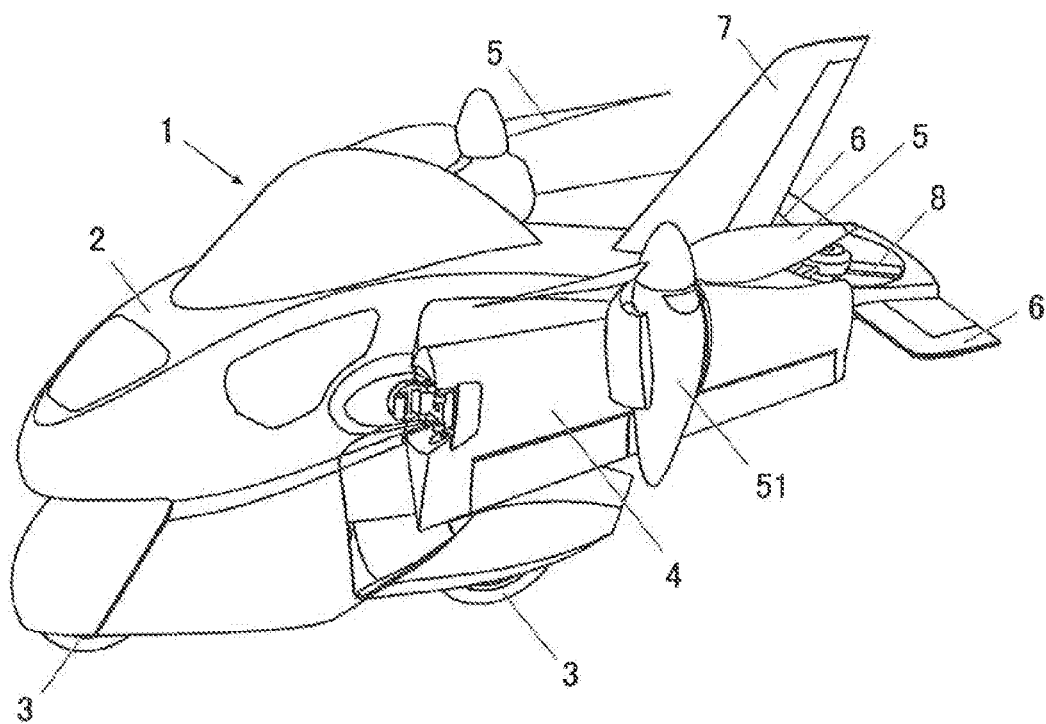
FIG. 1 is a diagram illustrating a configuration during ground traveling of a land-and-air vehicle according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In the following description, a vertical direction, a longitudinal direction, and a lateral direction will be described on the basis of the respective directions regarding the land-and-air vehicle.

[Configuration of Land-and-Air Vehicle]

Figure 2:
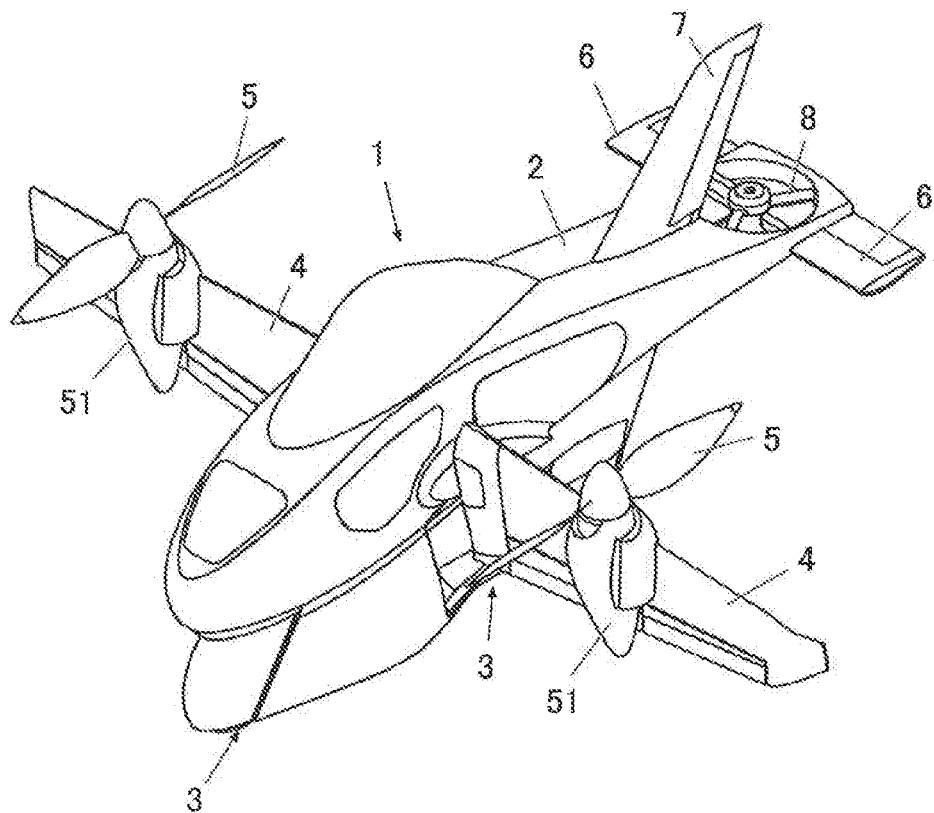
FIG. 2 is a diagram illustrating a configuration during flight (during takeoff and landing) of the land-and-air vehicle.
Figure 3:
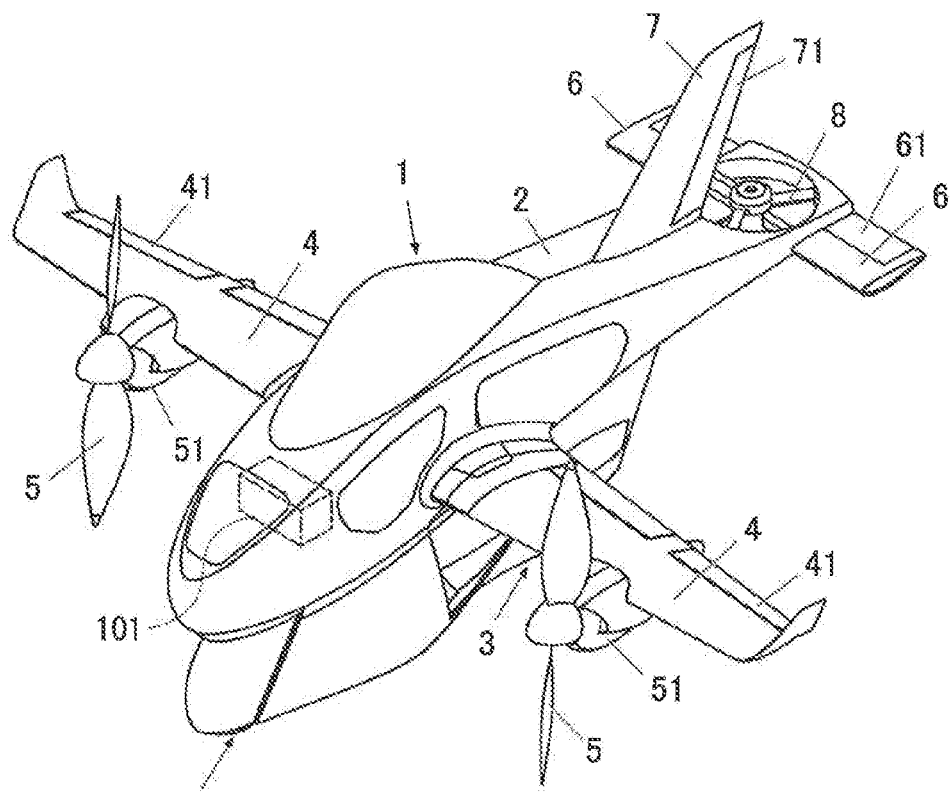
FIG. 3 is a diagram illustrating a configuration during flight (during cruising) of the land-and-air vehicle.

FIG. 1 illustrates a configuration during ground traveling of a land-and-air vehicle 1 according to an example embodiment of the technology. Of configurations during flight, FIG. 2 illustrates a configuration during takeoff and landing, and FIG. 3 illustrates a configuration during cruising.

The land-and-air vehicle 1 may mainly include a body 2, wheels 3, main wings 4, propellers 5, horizontal tails 6, a vertical tail 7, and a tail rotor 8.

The land-and-air vehicle 1 may be configured on the basis of a motorcycle, and may include two wheels, i.e., the front and rear wheels 3, disposed below the body 2.

An operator seat may be disposed substantially at the middle of the body 2. The operator seat may be provided with a handle and steps (e.g., see FIGS. 5A and 5B to be described later) that serve as a handle and steps of a motorcycle. This allows an operator sitting astride a seat of the operator seat to operate the handle and the steps to perform operation during ground traveling and steering during flight, for example. The handle and the steps, for example, according to the example embodiment will be described in detail later.

In the example embodiment, the body 2 may include an engine, an electric generator, and a battery, for example, which are not illustrated. The land-and-air vehicle 1 may be caused to travel by motive power of the engine during ground traveling.

The engine may be operated not only during ground traveling but also during flight to cause the electric generator to generate electric power. The generated electric power may be used to charge the battery and supplied to devices, for example. Examples of the devices may include electric motors 52 (described later) that drive the propellers 5.

The main wings 4 may be tilt wings provided with the propellers 5. The main wings 4 may have a tilt angle variable between a state in which the propellers 5 face upward (see FIG. 2) and a state in which the propellers 5 face forward (see FIG. 3). For example, the tilt angle may be set to 0 degrees in a case where the main wings 4 are oriented in the horizontal direction (i.e., a case where the propellers 5 face forward), and set to 90 degrees in a case where the main wings 4 are oriented in the vertical direction (i.e., a case where the propellers 5 face upward).

In a state in which the propellers 5 face upward, the main wings 4 may be configured to pivot between two states via hinge mechanisms attached to respective side surfaces of the body 2. The two states may include a state of being folded along the body 2 (see FIG. 1) and a state of being open toward sides of the body 2 (see FIG. 2).

Figure 4:
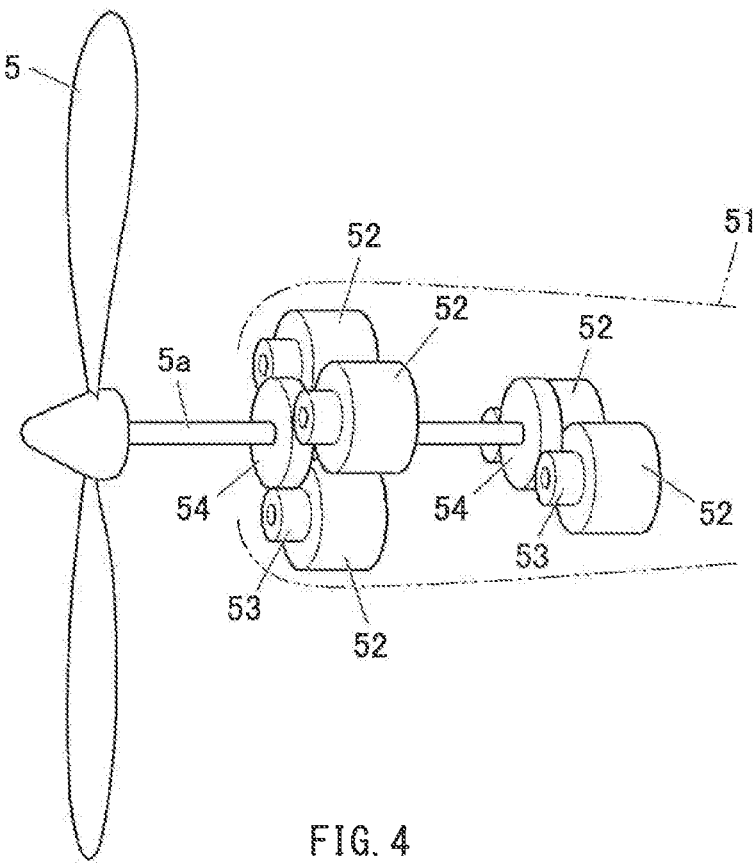
FIG. 4 is a diagram illustrating a configuration of a propeller included in the land-and-air vehicle.

Each of the propellers 5 may be attached to the main wing 4, and may be driven by the electric motors 52 provided in a nacelle 51, as illustrated in FIG. 4. In the example embodiment, the propeller 5 may be driven by the multiple electric motors 52 to be prevented from stopping rotation even if any of the electric motors 52 stops due to a malfunction, for example.

In one example, the nacelle 51 may include three electric motors 52 disposed on the front side and two electric motors 52 disposed on the rear side, as illustrated in FIG. 4. In this example, the electric motors 52 may be designed to allow first gears 53 to engage with second gears 54. The first gears 53 may be attached to output shafts of the respective electric motors 52. The second gears 54 may be fixed to the front side and the rear side of a propeller shaft 5a of the propeller 5.

In the example embodiment, the tail rotor 8 may be provided in a rear part of the land-and-air vehicle 1, in other words, at a portion of the body 2 that is between the right and left horizontal tails 6 and behind the vertical tail 7. The tail rotor 8 may have a rotating shaft that is oriented substantially in the vertical direction.

The tail rotor 8 may also be driven by multiple electric motors (not illustrated).

The body 2, for example, may additionally accommodate devices including an electronic control unit (ECU) and various measurement devices and sensors, which are ordinarily provided in a motorcycle, and various devices configured to activate a brake.

The body 2, for example, may also contain devices including various measurement devices and sensors, which are ordinarily provided in an aircraft, and an ECU 101. The ECU 101 may be configured to control, during flight, a speed of the propellers 5 and the tilt angle of the main wings 4, and control moving surfaces (see FIG. 3) including ailerons 41, elevators 61, and a rudder 71. In the example embodiment, the ECU 101 may include a microcomputer including a processor, various memories, and an input/output interface, for example. The ECU 101 for flight control may serve also as the ECU for ground traveling control.

In one embodiment, the body 2 may serve as a "main body". In one embodiment, the main wings 4 and the propellers 5 may serve as a "main wing unit". In one embodiment, the main wings 4 may serve as a "wing". In one embodiment, the ECU 101 may serve as a "controller". In one embodiment, a handle 10 and steps 20 (a right step 20R and a left step 20L) to be described later may respectively serve as a "handle" and a "step". In one embodiment, the handle 10 and the steps 20 may serve as an "operation unit". It is to be noted that the ECU for ground traveling control may be configured separately from the ECU 101 for flight control.

[Change in Form of Land-and-Air Vehicle]

Description will be given on a change in form, for example, of the land-and-air vehicle 1 according to the example embodiment.

In the example embodiment, in a case of getting on the land-and-air vehicle 1, the operator may cause either one of the right and left main wings 4 to pivot in an opening direction from a state illustrated in FIG. 1, and open a door beside the operator seat to get in the operator seat. The operator may sit astride the seat in the same way as in getting on a motorcycle, and cause the main wing 4 to pivot in a closing direction. Thereafter, the operator may close the door, and bring the land-and-air vehicle 1 into a form during ground traveling (hereinafter referred to as a ground traveling form), as illustrated in FIG. 1. In one embodiment, the ground traveling form may serve as a "first form".

In a case of getting off the land-and-air vehicle 1, the operator may open a door beside the operator seat, and thereafter cause either one of the right and left main wings 4 to pivot in the opening direction from the ground traveling form. The operator may get off the seat in the same way as in getting off a motorcycle, close the door, and thereafter cause the main wing 4 to pivot to close the main wing 4.

During ground traveling, in a state of having got on the land-and-air vehicle 1 in the manner described above, the operator may cause the land-and-air vehicle 1 to travel by operating the handle and the steps as in a case of causing a motorcycle to travel.

In the example embodiment, the land-and-air vehicle 1 may change its form during flight.

For example, in a case of performing flight, the land-and-air vehicle 1 may change its form from the ground traveling form to a state in which the right and left main wings 4 are opened toward the sides of the body 2 with the propellers 5 being kept facing upward (see FIG. 2). Hereinafter, this form may be referred to as a takeoff-and-landing form.

During takeoff, the land-and-air vehicle 1 may take off by ascending in the vertical direction while keeping the takeoff-and-landing form. Also during landing, the land-and-air vehicle 1 may land by descending in the vertical direction in the takeoff-and-landing form.

After taking off in the takeoff-and-landing form as described above, the land-and-air vehicle 1 is able to tilt the right and left main wings 4 forward. In this case, the land-and-air vehicle 1 may be configured to change the tilt angle of the main wings 4 by a predetermined angle, such as 10 degrees or 15 degrees.

Changing the tilt angle of the main wings 4 makes it possible to change a flying speed of the land-and-air vehicle 1. The flying speed may be zero (only movement in the vertical direction) in the takeoff-and-landing form in which the propellers 5 face upward, and the flying speed may be highest in a state in which the propellers 5 face forward (see FIG. 3).

Hereinafter, the form in which the propellers 5 face forward as illustrated in FIG. 3 may be referred to as a cruising form, and a form between the takeoff-and-landing form (see FIG. 2) and the cruising form (see FIG. 3) may be referred to as a transition flight form. The transition flight form, which is not illustrated, may indicate the form in transitioning from the takeoff-and-landing form to the cruising form (or from the cruising form to the takeoff-and-landing form). In one embodiment, the takeoff-and-landing form and the cruising form may serve as a "second form".

In a case of causing the land-and-air vehicle 1 to make a roll motion during flight, for example, in the takeoff-and-landing form, the roll motion may be caused by causing a difference in thrust between the right and left propellers 5. In the cruising form, the roll motion may be caused by causing a difference in lift between the right and left main wings 4 by operating the ailerons 41 of the right and left main wings 4. In the transition flight form, the roll motion may be caused by performing these operations in combination.

Thus, in a case of causing the land-and-air vehicle 1 to make roll, pitch, and yaw motions during flight, it may be necessary to perform operations in combination, depending on the form of the land-and-air vehicle 1 (the takeoff-and-landing form, the transition flight form, or the cruising form). Examples of the operations may include an operation performed on the propellers 5 to adjust thrust and an operation performed on the moving surfaces including the ailerons 41.

Therefore, in the example embodiment, in a case where the handle and the steps are operated by the operator during flight of the land-and-air vehicle 1, the ECU 101 may acquire signals (e.g., values measured by sensors) based on the operations, and perform a calculation process. The operations performed on the handle and the steps will be described later.

The ECU 101 may transmit signals to controllers of the electric motors 52 that drive the propellers 5 and to actuators of the moving surfaces, for example. The ECU 101 may thus perform control to cause the land-and-air vehicle 1 to perform an appropriate action based on the form taken by the land-and-air vehicle 1 at that point in time.

In the example embodiment, the operator may select the form of the land-and-air vehicle 1 between the ground traveling form of traveling on the ground and a flight form of flying in the air by, for example, operating a touch panel (not illustrated). The touch panel may be disposed in front of the handle, for example.

The land-and-air vehicle 1 may take the ground traveling form upon selection of the ground traveling form, and take the takeoff-and-landing form upon selection of the flight form.

As described above, either of the ground traveling form and the flight form may be selected by the operator operating the touch panel, for example. Instead of such a configuration, the land-and-air vehicle 1 may be provided with a sensor that detects opening and closing of the right and left main wings 4, for example. This configuration makes it possible to determine that the ground traveling form is selected if the operator causes the right and left main wings 4 to pivot in the closing direction, and to determine that the flight form is selected if the operator causes the right and left main wings 4 to pivot in the opening direction.

[Configuration of Handle and Steps of Land-and-Air Vehicle]

Now, description will be given on configurations of the handle and the steps, for example, of the land-and-air vehicle 1 according to the example embodiment.

Figure 5A:
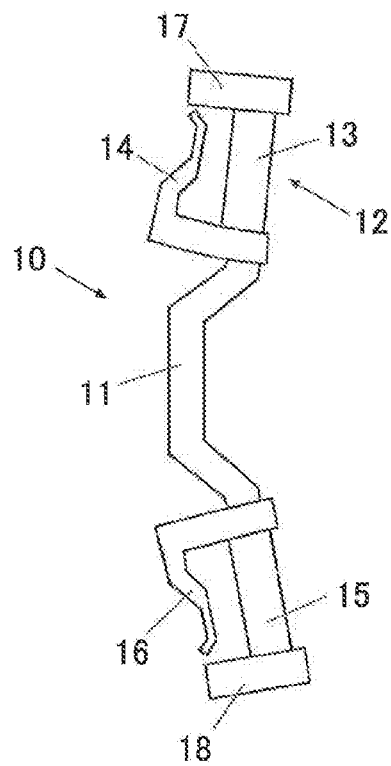
FIGS. 5A and 5B are diagrams respectively illustrating configurations of a handle and steps of the land-and-air vehicle.
Figure 5B:
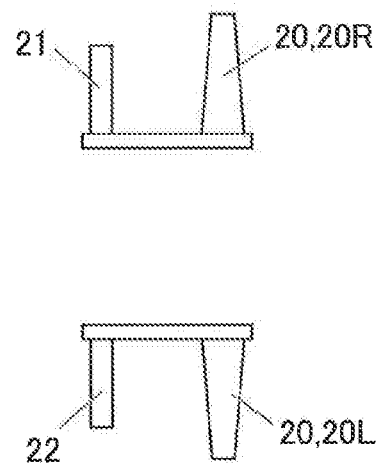

FIGS. 5A and 5B are schematic plan views of configurations of the handle and the steps, respectively, of the land-and-air vehicle 1 according to the example embodiment.

[Configuration for Ground Traveling]

As described above, the land-and-air vehicle 1 according to the example embodiment may be configured to allow, during ground traveling, the operator to cause the land-and-air vehicle 1 to travel by operating the handle and the steps as in a case of causing a motorcycle to travel.

Therefore, in the example embodiment, the handle 10 and the steps 20 of the land-and-air vehicle 1 may be configured to serve as a handle and steps of a motorcycle. The handle 10 and the steps 20 according to the example embodiment may have a structure that includes an operation unit in addition to a handle and steps of a motorcycle.

In one example, the handle 10 of the land-and-air vehicle 1 according to the example embodiment may include a bar-like handlebar 11 extending in the lateral direction. A right handle grip 12 of the handlebar 11 may be provided with an engine throttle 13 (also referred to as an accelerator, for example). A brake lever 14 may be disposed in front of the engine throttle 13. In one embodiment, the engine throttle 13 may serve as a "first throttle".

During ground traveling, the engine throttle 13 may be turned about the right handle grip 12 to control (increase or decrease) a speed of the engine, and the brake lever 14 may be gripped to apply a brake to the front wheel.

A clutch lever 16 may be disposed in front of a left handle grip 15 of the handlebar 11. The clutch lever 16 may be gripped during ground traveling to declutch the land-and-air vehicle 1.

During ground traveling, it is also possible to cause the land-and-air vehicle 1 to make a yaw motion by steering with the handle 10, for example, by swinging the handlebar 11 about a steering shaft. In one example, the handlebar 11 may be turned to the right to cause the land-and-air vehicle 1 to make a right-hand turn (or a right turn), and the handlebar 11 may be turned to the left to cause the land-and-air vehicle 1 to make a left-hand turn (or a left turn).

The right and left pair of steps 20 of the land-and-air vehicle 1 according to the example embodiment may include the step 20R on the right side and the step 20L on the left side. A brake pedal 21 may be disposed in front of the step 20R. The brake pedal 21 is vertically swingable about a shaft of the step 20R. The brake pedal 21 may be depressed during ground traveling to apply a brake to the rear wheel.

A shift pedal 22 may be disposed in front of the step 20L, allowing shifting gears with the use of the shift pedal 22. As with the brake pedal 21, the shift pedal 22 is vertically swingable about a shaft of the step 20L. During ground traveling, the shift pedal 22 may be raised to shift to a higher gear, and the shift pedal 22 may be depressed to shift to a lower gear.

In other words, in the land-and-air vehicle 1 according to the example embodiment, the handle 10 and the steps 20 may be configured to serve as a handle and steps of a motorcycle. During ground traveling, operating devices (i.e., the handle 10 and the steps 20) may be operated in the same way as in operating a handle and steps of an ordinary motorcycle. This makes it possible to operate the land-and-air vehicle 1 in the same way as in operating an ordinary motorcycle.

[Configuration for Flight]

The land-and-air vehicle 1 according to the example embodiment may allow, in the flight form, the operator to select an operation mode from a manual operation mode, an assisted operation mode, and an automatic operation mode.

[Manual Operation Mode]

In the manual operation mode in the flight form, the operator is able to control, by him/herself, the roll, pitch, and yaw motions of the land-and-air vehicle 1, the speed of the propellers 5, and the tilt angle of the main wings 4.

[Yaw Motion]

As with during ground traveling, a yaw motion is controllable by steering with the handle 10 (e.g., swing of the handlebar 11 about the steering shaft).

In one example, the handle 10 may be provided with a sensor, for example, that measures a swing angle of the handlebar 11 about the steering shaft. When the operator swings the handlebar 11 about the steering shaft, the sensor, for example, may measure the swing angle of the handlebar 11 and transmit the swing angle to the ECU 101. The ECU 101 may cause the land-and-air vehicle 1 to make a yaw motion by, for example, causing the rudder 71 of the vertical tail 7 (e.g., see FIG. 3) to pivot on the basis of the swing angle. In the example embodiment, the handlebar 11 may be turned to the right to cause the land-and-air vehicle 1 to make a right-hand yaw motion (a right turn), and the handlebar 11 may be turned to the left to cause the land-and-air vehicle 1 to make a left-hand yaw motion (a left turn).

In the example embodiment, as described above, it is possible to cause the land-and-air vehicle 1 to make a yaw motion also during ground traveling by steering with the handle 10 (swing of the handlebar 11 about the steering shaft). This configuration makes it possible to cause the land-and-air vehicle 1 to make a yaw motion both during ground traveling and during flight by steering with the handle 10 (swing of the handlebar 11 about the steering shaft).

Therefore, the land-and-air vehicle 1 according to the example embodiment allows the operator to, in a case of causing the land-and-air vehicle 1 to make a yaw motion during flight, operate the operating device (in this case, the handle 10) with a sensation similar to that during ground traveling. This enables the operator to, both during ground traveling and during flight, operate the handle 10 to cause the land-and-air vehicle 1 to make a yaw motion, without erroneously operating the handle 10.

[Control of Speed of Propeller (Engine)]

The speed of the propellers 5 may be controlled (in the example embodiment, a speed of the electric motors 52 may be increased or decreased) during flight. This may be achieved by operating a motor throttle 17 (see FIG. 5A) provided near the engine throttle 13 of the handle 10. In one embodiment, the motor throttle 17 may serve as a "second throttle".

In the example embodiment, the motor throttle 17 may be attached to an end of the right handle grip 12 of the handlebar 11 to be substantially orthogonal to the right handle grip 12. The end may be near the engine throttle 13.

Figure 6:
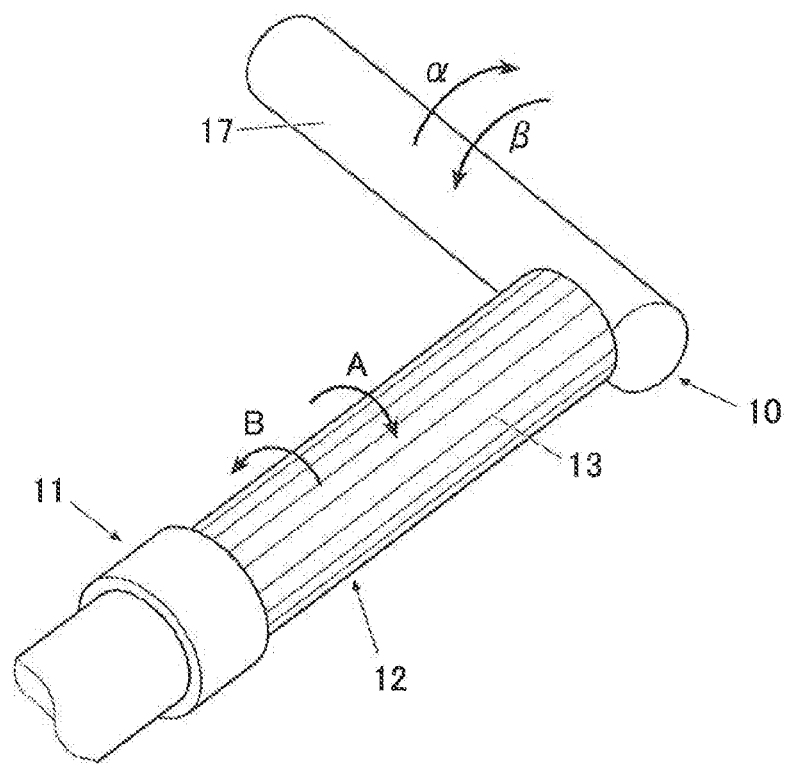
FIG. 6 is an enlarged perspective view of a portion of the handle included in the land-and-air vehicle, the portion including a motor throttle, and illustrates a relationship in direction between rotation of an engine throttle and pivot of the motor throttle.

The operator may hold the motor throttle 17, and cause the motor throttle 17 to pivot to raise the motor throttle 17 from a state of jutting forward from the right handle grip 12 (see an arrow α in the drawing) or, conversely, to tilt the motor throttle 17 forward from the raised state (see an arrow β in the drawing), as illustrated in FIG. 6.

The handle 10 may be provided with a sensor, for example, that measures a pivot angle of the motor throttle 17. When the operator causes the motor throttle 17 to pivot to raise the motor throttle 17, the sensor, for example, may measure the pivot angle of the motor throttle 17 and transmit the pivot angle to the ECU 101. The ECU 101 may increase the speed of the propellers 5 on the basis of the pivot angle.

Conversely, when the operator causes the motor throttle 17 to pivot to tilt the motor throttle 17 forward from the raised state, the sensor, for example, may measure the pivot angle of the motor throttle 17 and transmit the pivot angle to the ECU 101. The ECU 101 may decrease the speed of the propellers 5 on the basis of the pivot angle. It is to be noted that FIG. 6 does not illustrate the brake lever 14, for example.

During ground traveling, the speed of the engine may be increased by turning the engine throttle 13 in the same direction (the arrow α) as that in increasing the speed of the propellers 5 with the use of the motor throttle 17, as indicated by an arrow A in the drawing. The speed of the engine may be decreased by turning the engine throttle 13 in the same direction (the arrow β) as that in decreasing the speed of the propellers 5 with the use of the motor throttle 17, as indicated by an arrow B in the drawing.

Thus, the land-and-air vehicle 1 according to the example embodiment allows the operator to, in a case of increasing or decreasing the speed of the propellers 5 of the land-and-air vehicle 1 during flight, operate the operating device (in this case, the motor throttle 17 near the engine throttle 13), with a sensation similar to that in operating the engine throttle 13 in increasing or decreasing the speed of the engine during ground traveling. In other words, in this case, it is possible for the operator to cause the motor throttle 17 to pivot with a sensation similar to that in turning the engine throttle 13.

This enables the operator to, during flight, operate the motor throttle 17 to increase or decrease the speed of the propellers 5, without erroneously operating the motor throttle 17.

When the operator's hand turning the engine throttle 13 in the direction of the arrow A is relaxed, the engine throttle 13 may automatically return to the original position, i.e., turn in the opposite direction (the direction of the arrow B), causing the speed of the engine to automatically decrease. However, if the raised motor throttle 17 automatically returns to the original position in the same way, the speed of the propellers 5 automatically decreases.

Therefore, in the example embodiment, the motor throttle 17 may be provided as a device separate from the engine throttle 13 to prevent the motor throttle 17 from automatically returning to the original position (i.e., from turning in the direction of the arrow β) even if the hand raising the motor throttle 17 is relaxed.

In the example embodiment, even if the operator operates the engine throttle 13 during flight, the speed of the propellers 5 may not be controlled by the operation.

In addition, during flight, the speed of the engine may be automatically controlled, and even if the operator operates the engine throttle 13, the speed of the engine may not be controlled by the operation.

Instead of such a configuration, the engine throttle 13 may be configured to serve also as a motor throttle. In other words, a configuration may be adopted in which, during flight, the speed of the propellers 5 is controllable by operating the engine throttle 13.

In this configuration, in a case where the operator has selected the flight form, the engine throttle 13 may not return even if the hand turning the engine throttle 13 (in this case, serving also as the motor throttle) in the direction of the arrow A is relaxed. This configuration may prevent the speed of the propellers 5 from decreasing, unless the operator intentionally returns the engine throttle 13 (the motor throttle).

[Control of Tilt Angle of Main Wings]

As described above, in the example embodiment, the land-and-air vehicle 1 may travel at a higher speed upon shifting to a higher gear and at a lower speed upon shifting to a lower gear during ground traveling, in response to operation of the shift pedal 22 (see FIG. 5B).

During flight, the land-and-air vehicle 1 may fly at a higher speed in the longitudinal direction (see FIG. 3) as the tilt angle of the main wings 4 is smaller, and at a lower speed in the longitudinal direction (see FIG. 2) as the tilt angle of the main wings 4 is larger. A smaller tilt angle may indicate that the main wings 4 are more tilted to be closer to a horizontal state.

Therefore, in the example embodiment, the land-and-air vehicle 1 may be configured to enable the tilt angle of the main wings 4 to be controlled during flight by performing, on the shift pedal 22 of the steps 20, the same operation as that performed in shifting gears during ground traveling.

In one example, the step 20 (20L) may be provided with a sensor, for example, that measures a swing angle of the shift pedal 22. When the operator raises the shift pedal 22, the sensor, for example, may measure the swing angle of the shift pedal 22 and transmit the swing angle to the ECU 101. Each time the swing angle exceeds a predetermined angle, for example, the ECU 101 may decrease the tilt angle of the main wings 4 by a predetermined angle to tilt the main wings 4 further forward, making the flying speed higher.

When the operator depresses the shift pedal 22, the sensor, for example, may measure the swing angle of the shift pedal 22 and transmit the swing angle to the ECU 101. Each time the swing angle exceeds a predetermined angle, for example, the ECU 101 may increase the tilt angle of the main wings 4 by a predetermined angle to cause the main wings 4 to face further upward, making the flying speed lower.

Thus, the land-and-air vehicle 1 according to the example embodiment allows the operator to, in a case of increasing or decreasing the flying speed of the land-and-air vehicle 1, operate the operating device (in this case, the shift pedal 22 of the steps 20) with a sensation similar to that in increasing or decreasing the speed of the land-and-air vehicle 1 during ground traveling.

This enables the operator to, during flight, operate the shift pedal 22 of the steps 20 to increase or decrease the speed of the land-and-air vehicle 1, without erroneously operating the shift pedal 22.

[Roll Motion]

During flight in the manual operation mode, it may be necessary to cause the land-and-air vehicle 1 to make a roll motion and a pitch motion as well as a yaw motion, in response to an operation performed by the operator.

Hence, in the example embodiment, the land-and-air vehicle 1 may be provided with a unit that causes the land-and-air vehicle 1 to make a roll motion during flight, and a unit that causes the land-and-air vehicle 1 to make a pitch motion during flight.

In regard to steps ordinarily provided in a motorcycle, neither of right and left steps vertically moves by itself, though a brake pedal and a shift pedal vertically move.

In contrast, in the land-and-air vehicle 1 according to the example embodiment, the right and left steps 20R and 20L (see FIG. 5B) may be configured to vertically move by themselves. The right and left steps 20R and 20L may vertically move independently of each other by being depressed from above by the operator. During flight, the land-and-air vehicle 1 may be caused to make a roll motion, on the basis of a difference in amount of depression between the right and left steps 20R and 20L caused by the operator.

In one example, the land-and-air vehicle 1 may be provided with sensors, for example, that measure amounts of depression of the respective steps 20R and 20L. When the operator depresses the steps 20R and 20L, the sensors, for example, may measure respective amounts of the depression, and transmit the amounts of depression to the ECU 101.

In a case where the operator depresses the step 20R on the right side more greatly than the step 20L on the left side, the ECU 101 may, for example, tilt the land-and-air vehicle 1 in a right-hand direction (i.e., clockwise toward the front) by increasing lift produced for the main wing 4 on the left side. This increase in lift may be achieved by raising the aileron 41 of the main wing 4 on the right side, whereas lowering the aileron 41 of the main wing 4 on the left side, for example. The case where the operator depresses the step 20R on the right side more greatly than the step 20L on the left side may include a case where the operator does not depress the step 20L on the left side.

Conversely, in a case where the operator depresses the step 20L on the left side more greatly than the step 20R on the right side, the ECU 101 may tilt the land-and-air vehicle 1 in a left-hand direction (i.e., counterclockwise toward the front) by increasing lift produced for the main wing 4 on the right side by controlling the ailerons 41. The case where the operator depresses the step 20L on the left side more greatly than the step 20R on the right side may include a case where the operator does not depress the step 20R on the right side.

In another example, the steps 20R and 20L may be coupled to each other. When a shaft coupling the steps 20R and 20L rotates on the basis of a difference in amount of depression between the right and left steps, an angle of the rotation may be detected by an angle sensor, for example. The land-and-air vehicle 1 may be caused to make a roll motion on the basis of the detected rotation angle. In still another example, the land-and-air vehicle 1 may further include mechanisms that enable the steps 20R and 20L to vertically slide, and springs that bias the steps 20R and 20L upward. The land-and-air vehicle 1 may be caused to make a roll motion on the basis of a difference in amount of expansion between the springs.

In a case of causing the land-and-air vehicle 1 to make a roll motion during flight, instead of the above-described configuration, the following configuration may be adopted, for example.

Although not illustrated, the right and left pair of steps 20R and 20L may be configured not to vertically move, as with an ordinary motorcycle. The right and left steps 20R and 20L may each be provided with a device (e.g., a strain gauge) configured to measure a load applied from above. This configuration makes it possible to cause, during flight, the land-and-air vehicle 1 to make a roll motion on the basis of a difference in load between the right and left steps 20R and 20L.

Such a configuration also makes it possible to cause the land-and-air vehicle 1 to make a roll motion unerringly to the right or left, as with the above-described configuration.

[Pitch Motion]

In the example embodiment, as illustrated in FIG. 5A, the handle 10 may be provided with a pitch handle 18 having a shape similar to that of the motor throttle 17 (see FIG. 6). The pitch handle 18 may be provided on the side opposite to the motor throttle 17, i.e., at an end of the left handle grip 15 of the handlebar 11, to be substantially orthogonal to the left handle grip 15.

The pitch handle 18 may be operated in a way similar to that for the motor throttle 17 described above. Causing the pitch handle 18 to pivot to raise the pitch handle 18 may cause a nose of the land-and-air vehicle 1 to move up (pitch up), and causing the pitch handle 18 to pivot to tilt the pitch handle 18 forward may cause the nose to move down (pitch down).

In the example embodiment, the handle 10 may be provided with a sensor, for example, that measures a swing angle of the pitch handle 18. This enables, when the operator operates the pitch handle 18 during flight, the ECU 101 to control pitch up and pitch down of the land-and-air vehicle 1 on the basis of an amount of operation (i.e., the swing angle) of the pitch handle 18.

In the example embodiment, the ECU 101 may cause the land-and-air vehicle 1 to pitch up or pitch down by controlling a speed of the tail rotor 8 in a case where the land-and-air vehicle 1 is in the takeoff-and-landing form (see FIG. 2), by controlling the elevators 61 in a case where the land-and-air vehicle 1 is in the cruising form (see FIG. 3), and by controlling both the speed of the tail rotor 8 and the elevators 61 in a case where the land-and-air vehicle 1 is in the transition flight form.

[Assisted Operation Mode]

In the above-described manual operation mode, the operator may operate the land-and-air vehicle 1 by finely controlling, by him/herself, roll, pitch, and yaw motions of the land-and-air vehicle 1, the speed of the propellers 5, and the tilt angle of the main wings 4. In contrast, in the assisted operation mode in the flight form, the operator may operate the handle 10 and the steps 20 to give instructions about only "turn", "ascent/descent", and "flying speed" to the land-and-air vehicle 1 (to be exact, the ECU 101 described above). The ECU 101 may be configured to assist, on the basis of the instructions, flight operations performed by the operator.

[Turn]

In one example, in the example embodiment, the operator may swing the handlebar 11 of the handle 10 about the steering shaft, thereby instructing the ECU 101 to cause the land-and-air vehicle 1 to make a right turn or a left turn.

In a case of causing the land-and-air vehicle 1 to make a turn, it may be necessary to cause the land-and-air vehicle 1 to make a roll motion as well as a yaw motion, or to accelerate, for example, on an as-needed basis.

Therefore, in the example embodiment, when the handlebar 11 is swung about the steering shaft in the assisted operation mode, the ECU 101 may cause the land-and-air vehicle 1 to appropriately perform a yaw motion, a roll motion, and actions including acceleration on an as-needed basis, on the basis of a direction of the swing and the swing angle. The ECU 101 may thereby cause the land-and-air vehicle 1 to make a right turn or a left turn with a curvature based on the swing angle.

In the example embodiment, the operator may swing the handlebar 11 about the steering shaft to make a right turn or a left turn also during ground traveling and during flight in the manual operation mode.

Therefore, the land-and-air vehicle 1 according to the example embodiment makes it possible to, in making a right turn or a left turn during flight in the assisted operation mode, operate the operating device (in this case, the handlebar 11) with a sensation similar to that during ground traveling and during flight in the manual operation mode, to cause the land-and-air vehicle 1 to make a turn.

[Ascent/Descent]

In the example embodiment, the operator may cause the motor throttle 17 (see FIG. 5A) to pivot to raise the motor throttle 17 or to tilt the motor throttle 17 forward, thereby instructing the ECU 101 to cause the land-and-air vehicle 1 to ascend or descend.

In the above-described manual operation mode, operating the motor throttle 17 only causes the speed of the propellers 5 to increase or decrease. However, when the land-and-air vehicle 1 takes off or lands, the operator may carefully operate the motor throttle 17 (increase or decrease the speed of the propellers 5) in the takeoff-and-landing form (see FIG. 2) to cause the land-and-air vehicle 1 to ascend or descend.

Therefore, the operator may be provided with an image of association between operation of the motor throttle 17 and ascent or descent of the land-and-air vehicle 1. This enables the operator to accept, without perplexity, a configuration of operating the motor throttle 17 to give an instruction about ascent or descent of the land-and-air vehicle 1 in the assisted operation mode.

In a case where the land-and-air vehicle 1 is in the takeoff-and-landing form, the land-and-air vehicle 1 may be caused to ascend or descend by increasing or decreasing the speed of the propellers 5 as described above. However, in a case where the land-and-air vehicle 1 is in the cruising form (see FIG. 3) or the transition flight form, it may be necessary to cause the land-and-air vehicle 1 to pitch up or pitch down, and also to accelerate or decelerate or increase or decrease the tilt angle of the main wings 4 on an as-needed basis.

Therefore, in the example embodiment, when the motor throttle 17 is operated to be raised or tilted forward in the assisted operation mode, the ECU 101 may cause the land-and-air vehicle 1 to pitch up or pitch down, and also to appropriately perform actions, including acceleration or deceleration and increase or decrease of the tilt angle of the main wings 4, on an as-needed basis, on the basis of the pivot angle of the motor throttle 17, for example. The ECU 101 may thereby cause the land-and-air vehicle 1 to ascend or descend in a degree based on the pivot angle.

[Flying Speed]

In the example embodiment, the operator may raise or depress the shift pedal 22 of the steps 20, thereby instructing the ECU 101 to increase or decrease the flying speed of the land-and-air vehicle 1.

As described above, in the example embodiment, the land-and-air vehicle 1 may travel at a higher speed upon shifting to a higher gear and at a lower speed upon shifting to a lower gear during ground traveling, in response to operation of the shift pedal 22 (see FIG. 5B), as in case of an ordinary motorcycle. Also during flight in the manual operation mode, operating the shift pedal 22 may cause the tilt angle of the main wings 4 to change, increasing or decreasing the flying speed of the land-and-air vehicle 1.

Therefore, in increasing or decreasing the flying speed during flight in the assisted operation mode, it is possible to operate the operating device (in this case, the shift pedal 22) with a sensation similar to that during ground traveling and during flight in the manual operation mode, to change the flying speed of the land-and-air vehicle 1.

Also in this case, to increase or decrease the flying speed of the land-and-air vehicle 1, it may be necessary to not only change the tilt angle of the main wings 4, but also change the speed of the propellers 5, for example.

Therefore, in the example embodiment, when the shift pedal 22 is operated in the assisted operation mode, the ECU 101 may cause the land-and-air vehicle 1 to appropriately change the tilt angle of the main wings 4 and the speed of the propellers 5, for example. The ECU 101 may thereby increase or decrease the flying speed of the land-and-air vehicle 1 on the basis of the instruction.

[Automatic Operation Mode]

As described above, in the example embodiment, it is possible in the flight form to select the automatic operation mode, in addition to the manual operation mode and the assisted operation mode described above.

When the automatic operation mode is selected and the operator inputs the current location, a destination, and a route, for example, the ECU 101 may automatically control devices in response to the inputted information, thereby causing the land-and-air vehicle 1 to fly.

As described above, the example embodiment provides a land-and-air vehicle that is operable during flight with a sensation similar to that during ground traveling.

Even if a land-and-air vehicle may be steered by the same operating device both during ground traveling and during flight, the operating device is generally operated by different methods between during ground traveling and during flight. This makes it necessary for an operator to learn the method of operating the operating device during ground traveling and the method of operating the operating device during flight. In some land-and-air vehicles, a method of operating an operating device during ground traveling may be similar to that for an ordinary vehicle (e.g., an automobile). Even in such a case, an operator is often unfamiliar with a method of operating an operating device, such as an operating stick or a steering wheel, included in an aircraft or a helicopter, for example. It is therefore necessary for the operator to additionally learn the method of operating the operating device during flight. This increases burden to be imposed on the operator for the operator to learn to operate the land-and-air vehicle. Furthermore, if methods of operating one operating device are different between during ground traveling and during flight, the operating device may possibly be operated erroneously, for example, the method to be used during ground traveling may possibly be used for operation during flight.

To avoid such a concern, an operating device may be configured to be operated in similar ways in a case of causing a land-and-air vehicle to behave similarly between during ground traveling and during flight. For example, similar operations may be performed on the operating device between a case of increasing or decreasing a speed of an engine during ground traveling and a case of increasing or decreasing a speed of propellers during flight. In other words, during flight, the land-and-air vehicle may be operable with a sensation similar to that during ground traveling.

With this in view, in the example embodiment, the operating device is operable during flight with a sensation similar to that during ground traveling, as described above. This makes it possible to avoid burden to be imposed on the operator in a case where methods of operating the operating device are different between during ground traveling and during flight, and to reduce confusion over operations between during ground traveling and during flight.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

Figure 7A:
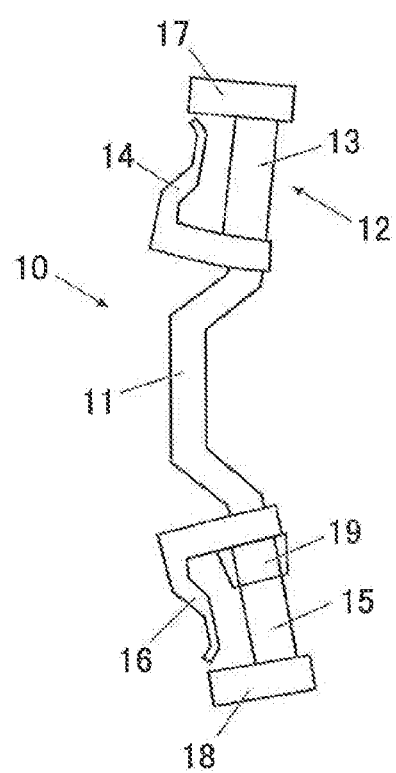
FIGS. 7A and 7B are diagrams respectively illustrating configurations of a handle and steps of a land-and-air vehicle according to one example embodiment of the technology, and illustrate an example in which the handle is provided with a shift lever.
Figure 7B:
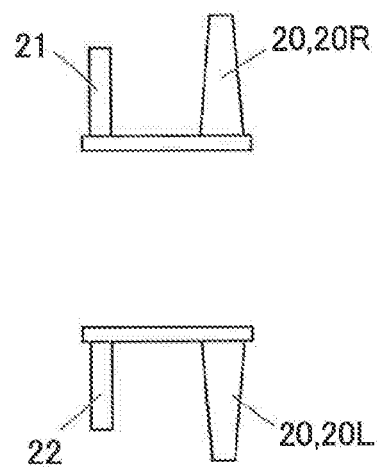

For example, some example embodiments describe a case where the shift pedal 22 of the steps 20 is used to change the tilt angle of the main wings 4 in the manual operation mode, or to change the flying speed of the land-and-air vehicle 1 in the assisted operation mode. Alternatively, for example, a portion of the left handle grip 15 of the handle 10 may be provided with a shift lever 19, as illustrated in FIGS. 7A and 7B. This configuration makes it possible to change the tilt angle of the main wings 4 and the flying speed by turning the shift lever 19 about the left handle grip 15.

Another configuration may be adopted in which both the shift pedal 22 and the shift lever 19 are usable.

For example, in flight in the manual operation mode or the assisted operation mode, a limitation may be imposed on an attitude angle in causing the land-and-air vehicle 1 to make roll, pitch, and yaw motions, to prevent unreasonable operation (e.g., a dive) beyond the flight envelope, as in the automatic operation mode. The attitude angle may be limited to 30 degrees or less, for example.

Furthermore, in a case where the destination or the route is changed in the automatic operation mode, for example, a predetermined operation performed by the operator may cause the automatic operation mode to be canceled to transition to the assisted operation mode or the manual operation mode.

The ECU 101 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 101. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the ECU 101 illustrated in FIG. 3.

The invention claimed is:

1. A land-and-air vehicle configured to change a form of the land-and-air vehicle between a first form for traveling on a land and a second form for traveling in an air, the land-and-air vehicle comprising:
    a main body including an operator seat for an operator;
    a main wing unit attached to the main body and including
        a wing configured to produce lift for the land-and-air vehicle;
    a first power source configured to generate first force for the land-and-air vehicle to travel on the land;
    a second power source configured to generate second force for the land-and-air vehicle to fly in the air;

an operation unit configured to be operated by the operator, the operation unit including a handlebar, the handlebar having a throttle unit that is disposed at one end of the handlebar and is operative to rotate around a center axis of the one end of the handlebar; and a controller configured to:

detect an operation of the handlebar by the operator, and in response to the detected operation, control yawing of the land-and-air vehicle even though the land-and-air vehicle is in the first form or the second form; and detect a rotation of the throttle unit by the operator, and in response to the detected rotation, control the first force when the land-and-air vehicle is in the first form and the second force when the land-and-air vehicle is in the second form, wherein the handlebar of the operation unit includes a pitch handle, wherein the controller is further configured to control, in response to an operation performed on the pitch handle, pitch up or pitch down of the land-and-air vehicle when the land-and-air vehicle is in the second form, wherein the first power source includes an engine, the land-and-air vehicle being configured to travel by motive power of the engine on the land, wherein the throttle unit comprises a first grip operative to rotate about the center axis to control the first force, and a second grip, adjacent to the first grip, operative to rotate about the center axis to control the second force, and the controller is configured to control a speed of the engine to control the first force when the land-and-air vehicle is in the first form in response to a rotation of the first grip, and to control the second force when the land-and-air vehicle is in the second form in response to a rotation of the second grip.

2. The land-and-air vehicle according to claim 1, wherein the main wing unit further includes a propeller disposed to produce the second force, and the controller is configured to change a speed of the propeller to control the second force when the land-and-air vehicle is in the second form.

3. The land-and-air vehicle according to claim 1, wherein the operation unit includes a step to be operated by a foot of the operator, the wing of the main wing unit has a variable tilt angle, and the controller is further configured to change the tilt angle in response to a predetermined operation performed on the step.

4. The land-and-air vehicle according to claim 3, wherein the predetermined operation comprises an operation performed in shifting gears when the land-and-air vehicle is in the first form.

5. The land-and-air vehicle according to claim 1, wherein the operation unit comprises a pair of steps to be operated by a foot of the operator, the pair of steps being configured to vertically move independently of each other, and the controller is further configured to control rolling of the land-and-air vehicle when the land-and-air vehicle is in the second form, on a basis of a difference between vertical positions of the pair of steps.

6. The land-and-air vehicle according to claim 1, wherein the operation unit comprises a pair of steps to be operated by a foot of the operator, the pair of steps being configured to receive respective loads applied from above the pair of steps, the loads being measurable through the pair of steps, and the controller is further configured to control rolling of the land-and-air vehicle when the land-and-air vehicle is in the second form, on a basis of a difference between the loads applied to the pair of steps.

* * * * *